Jan. 15, 1935. E. H. WEBER 1,988,431
BELT OF THE SIDE DRIVING TYPE
Filed Jan. 13, 1934

Inventor
Eugene H. Weber.
By A. J. O'Brien
Attorney

Patented Jan. 15, 1935

1,988,431

UNITED STATES PATENT OFFICE 1,988,431

BELT OF THE SIDE-DRIVING TYPE

Eugene H. Weber, Denver, Colo., assignor to The Gates Rubber Company, Denver, Colo., a corporation of Colorado Application January 13, 1934, Serial No. 706,495

7 Claims. (Cl. 74—233)

This invention relates to improvements in belts of the side driving type which are usually referred to as V-shaped belts.

In the transmission of power, it is customary to employ side driving belts that cooperate with grooved pulleys having inclined sides and in which the belts are so located that the bottom or inner surface of the belt by which is meant the side of the belt nearest the axis of the pulley, does not come in contact with the bottom of the groove. Where wide belts of this type are employed, as is sometimes necessary, it has been found that the stress in the belt when in use tends to bow it down or to bend it between and parallel with its longitudinal edges, and this flexure is often so great as to interfere with the proper operation of the belt by breaking its contact in part with the inclined walls of the cooperating pulley.

It is evident that if a V-belt that would fit the groove in the pulley properly when the belt is transversely straight, should be deformed by bending or flexing it downwardly or inwardly, as above indicated, to such an extent that the contact between the driving surfaces of the belt and the adjacent walls of the groove of the pulley is, to some extent, broken, that the driving efficiency of the belt will be lost to a corresponding extent.

It is the object of this invention to produce a belt of the type referred to which shall be provided with means for resisting downward or inward bending forces between its driving sides to such an extent as to prevent the belt from flexing sufficiently to interfere with its proper operation.

This invention, briefly described, consists in building a belt of this type with a transversely or crosswise extending layer or a number of such layers of parallel cords which have their ends anchored near the outer and upper corners of the belt and extend across the belt with the lower sides of the cords bowed downwardly to approach the inner surface of the belt. This cord reenforcing element acts like an inverted arch and serves as a tension member which offers a considerable resistance to any force tending to flex the belt downwardly, as above indicated.

Having thus briefly described the invention and its objects, it will now be described in detail, and for this purpose reference will be had to the accompanying drawing in which the preferred embodiment of the invention has been illustrated, and in which.

Figure 3:
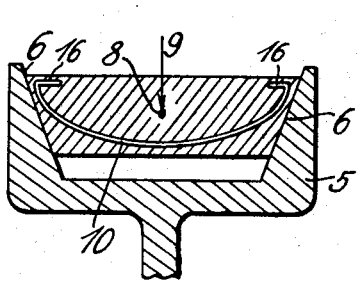
Fig. 3 is a transverse section through a pulley and a belt showing in a diagrammatic way the position of the transverse reenforcing member.

In the drawing the reference numeral 5 designates the rim of a grooved pulley of the type employed in connection with V-shaped side driving belts. The groove is provided with inclined contact surfaces 6 against which the inclined driving sides 7 of the belt rest when the belt is in operation. The inclination of the sides of the groove and of the belt should preferably be alike so as to get the same pressure at each unit area of surface. Where the belts are narrow, as they usually are in multiple drive transmissions employing belts of this type, there is very little distortion due to the downward or inward flexure of the belts, but where the belts have considerable width, as is the case with the belt shown in the drawing, the tension in the belt, due to the transmission of power, becomes considerable, and this can be considered as concentrated at the center of the belt on a line in which the reference numeral 8 in Fig. 3 indicates a point. The force has been indicated by the arrow 9. It is evident that the force exerted in the direction of the arrow will tend to bend the belt downwardly or inwardly and in order to resist this bending force, a transversely extending reenforcing layer of cords 10, has been provided.

Figure 4:
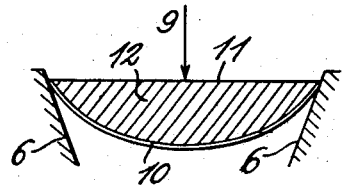
Fig. 4 is a diagrammatic view showing the principle on which this invention is based.

In Fig. 4 a diagrammatic representation of the structure has been shown. The ends of the cords 10 have been shown as resting against the inclined surfaces 6 of the pulley. The line 11 indicates a compression member and the material between line 11 and the inverted arch which has been indicated by reference numeral 12, designate the bracing between the two members.

It is evident that if a force is applied in the direction of arrow 9, this force will be resisted by the compression member 11 and by the tension member 10 in the manner of an ordinary bridge construction of this type. If the body of the belt were rigid, or if an incompressible bar 11 were used to connect the ends of the tension members, a quite rigid structure would be obtained. It is evident that in a belt, rigid material such as iron cannot ordinarily be used, and therefore there is some distortion, and naturally the transverse brace members cannot prevent all downward or inward flexure, but the flexure will be very much less than if the transverse reenforcing member 10 was absent.

Figure 2:
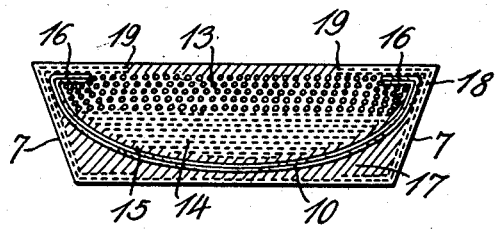
Fig. 2 is a transverse section taken on line 2—2, Fig. 1.

In Fig. 2, a transverse section has been shown as the actual belt construction. The belt consists of a substantially longitudinally inextensible core formed from rubberized cord which has been designated by reference numeral 13. Below the cords are a number of layers 14 of rubberized fabric. This fabric portion is formed from strips of different widths so as to be substantially convex. A layer of rubber 15 is placed on the under surface of the fabric portion and on the under surface of this rubber layer one or more layers 10, of cords are provided. The ends of the cords are usually bent as indicated at 16, so as to form an anchor. The under surface of the tension member 10 is covered with a rubber composition or rubberized fabric 17 and the driving sides and the bottom or inner surface of the belt are covered with bias cut rubberized fabric, which has been designated by reference numeral 18. The covering does not extend entirely across the top surface of the belt, but terminates along lines 19. One reason for not extending the fabric cover across the topside of the belt is that if it were so extended, there would be considerable tension present in this top layer of fabric and this tension would tend to bow the belt downwardly or inwardly at the longitudinal center when the belt is curved about a pulley, which would be objectionable as it is the downward flexure which is to be guarded against by this construction.

The actual construction of the belt is more or less immaterial, so far as this invention is concerned, because the function of the transverse reenforcing cords will be the same with any specific structure.

In Fig. 2 two layers of cord have been shown in the reenforcing member, but this is not essential as a single layer will often suffice, and if more are needed, as many layers can be provided as are deemed to be necessary.

It is evident that the inverted arch 10 will not serve its purpose unless it is concave along its upper surface and that it would be practically useless if it were made straight and parallel with the bottom of the belt. Applicant therefore wants it understood that when he employs the terms "inverted arch", and "inverted tension arch" he means one that is curved along its entire length or along so much of its length as is necessary to obtain the results desired.

Figure 1:
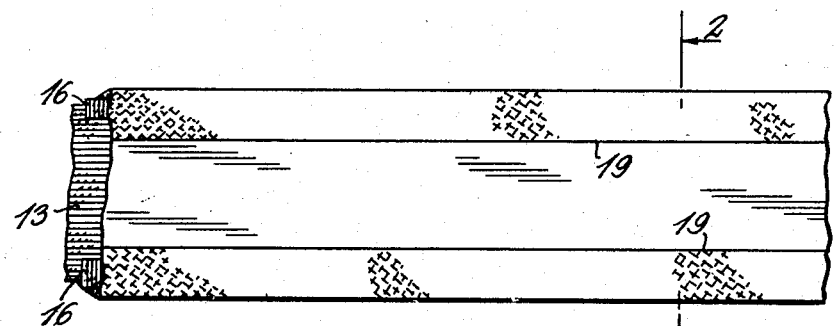
Fig. 1 is a plan view of the outer surface of a section of the belt.

In the specification and the claims the side of the belt shown in plan in Fig. 1 and at the top of Fig. 2 is referred to as the "top" or the "topside" of the belt while the other side is referred to as the "bottom" or the "inner face".

Having described the invention what is claimed as new is:

1. A power transmission belt of greater width than thickness of the V-shape cross section type with inclined driving surfaces in which there is a brace for resisting transverse flexure, said brace comprising a layer of cords that extend transversely from points adjacent the outer corners of the belt, the cord layer being regularly curved in such a way that the center of the cord layer is nearer the inside of the belt than the ends whereby an inverted tension resisting arch is formed, and an outside covering extending downwardly along the inclined driving surfaces and across the bottom of the belt.

2. A power transmission belt of greater width than thickness of the V-shape cross section type with inclined driving surfaces comprising, a substantially inextensible cord core located adjacent its top surface, a part composed of a plurality of strips of rubberized fabric adjacent the under surface of the core, the under surface of the fabric part being convex, a tension arch member composed of cords extending transversely of the belt between the outer corners and resting against the convex under surface, a cushion member of rubber composition on the under side of the tension arch and an outer covering of bias cut fabric.

3. A power transmission belt of V-shaped cross-section provided with nonparallel driving surfaces, in which there is a continuously curved transversely extending brace for resisting transverse flexure, said brace comprising a layer of cords whose ends terminate near the outer corners of the belt, the center of the continuously curved layer being nearer the inside of the belt than the ends whereby an inverted tension arch is formed, and a substantially inextensible cord core for resisting longitudinal strains located near the outer surface of the belt between the ends of the tension arch.

4. A power transmission belt of V-shaped cross section, provided with nonparallel driving surfaces, comprising, a substantially inextensible cord core formed from a plurality of parallel cords located adjacent the top of the belt; a body of readily deformable rubber composition located on the under side of the cord core, the under surface of the body being transversely convex and a tension arch composed of cords extending transversely of the belt and resting against the convex under surface of the body, the ends of the cords terminating adjacent the outer corners of the belt.

5. A power transmission belt of greater width than thickness, of V-shaped cross section and provided with nonparallel driving surfaces and having a brace for resisting forces tending to bend the belt downwardly or inwardly, said brace comprising a layer of cords extending transversely and continuously curved downwardly, the ends of the cords forming the brace terminating adjacent the outer corners of the belt, a body of readily deformable material comprising a rubber composition located above the brace and in the concave space, a layer of longitudinally extending cords located on the outside of the body of readily deformable material to resist longitudinal tensional strains.

6. A power transmission belt of V-shape cross section provided with nonparallel driving surfaces, and provided with a brace for resisting forces tending to bend the belt inwardly, said brace comprising a layer of substantially parallel cords having their ends anchored near the outer corners of the belt and being continuously curved downwardly so that the center is nearer the inside of the belt than the ends, a body of readily deformable material supported on the concave surface of the brace and a layer of longitudinally extending cords on the outside of the deformable body to resist longitudinal tensional strains, the belt being moulded into the shape desired.

7. A power transmission belt of V-shaped cross section, provided with nonparallel driving surfaces, comprising, a substantially inextensible cord core formed from a plurality of parallel cords located adjacent the top of the belt; a body of readily deformable rubber composition located on the under side of the cord core, the under surface of the body being transversely convex and a tension arch composed of cords extending transversely of the belt and resting against the convex under surface of the body, the ends of the tension arch terminating adjacent the outer corners of the belt.

EUGENE H. WEBER.